(12) United States Patent
Wood et al.

(10) Patent No.: US 7,828,356 B2
(45) Date of Patent: *Nov. 9, 2010

(54) CARGO MANAGEMENT SYSTEM

(75) Inventors: Kenneth L. Wood, Clinton Township, MI (US); Ian N. Dupret, Farmington Hills, MI (US); Derek Lane-Waters, Rochester Hills, MI (US); Arif Abbasi, Ann Arbor, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 495 days.

This patent is subject to a terminal disclaimer.

(21) Appl. No.: 11/856,102

(22) Filed: Sep. 17, 2007

(65) Prior Publication Data

US 2009/0074532 A1    Mar. 19, 2009

(51) Int. Cl.
*B62D 33/08*    (2006.01)
(52) U.S. Cl. ............... 296/26.11; 296/26.08; 296/37.6; 296/57.1; 410/129
(58) Field of Classification Search ............. 296/26.11, 296/26.08, 37.6, 57.1; 410/129, 140; 220/532, 220/533
See application file for complete search history.

(56) References Cited

U.S. PATENT DOCUMENTS

| | | | |
|---|---|---|---|
| 5,567,000 A | 10/1996 | Clare | |
| 5,784,769 A | 7/1998 | Clare | |
| 5,819,390 A | 10/1998 | Clare | |
| 5,823,598 A | 10/1998 | Clare et al. | |
| 5,979,617 A | 11/1999 | Clare et al. | |
| 5,979,973 A | 11/1999 | Clare et al. | |
| 6,007,130 A | 12/1999 | Clare et al. | |
| 6,012,754 A | 1/2000 | Clare et al. | |
| 6,030,018 A | 2/2000 | Clare et al. | |
| 6,033,002 A | 3/2000 | Clare et al. | |
| 6,036,258 A | 3/2000 | Clare et al. | |
| 6,105,231 A | 8/2000 | Clare et al. | |
| 6,142,549 A | 11/2000 | Clare et al. | |
| 6,237,211 B1 | 5/2001 | Clare et al. | |
| 6,499,795 B2 | 12/2002 | Clare | |
| 7,104,583 B2 | 9/2006 | Clare | |
| 7,413,231 B1 | 8/2008 | Wood et al. | |
| 7,431,368 B2 * | 10/2008 | Henderson et al. | 296/37.6 |
| 2001/0038217 A1 | 11/2001 | Clare et al. | |

* cited by examiner

*Primary Examiner*—Joseph D Pape
(74) *Attorney, Agent, or Firm*—Ralph E. Smith

(57) ABSTRACT

A cargo bed management system including a storage system composed of a receptacle integrated into a sidewall of a bed of a motor vehicle and a dividing system that divides or extends a bed of the motor vehicle. The dividing system includes a main panel having a length approximately equal to a width of the bed, and a pair of side panels hingedly connected to the main panel so that the side panels may rotate relative to the main panel from a stowed position where the side panels are integral with the main panel to an extended position where the side panels extend outward from the main panel. At least one bumper is affixed to an end of each of the side panels that are hingedly connected to the main panel such that the bumper increases a length of the main panel when said the panels are in the stowed position. The bumpers compress to secure the main panel and the side panels to the bed.

20 Claims, 7 Drawing Sheets

US 7,828,356 B2

CARGO MANAGEMENT SYSTEM

FIELD OF THE INVENTION

The present teachings relate to an apparatus for dividing or extending the bed of a motor vehicle and for providing a storage receptacle into a side panel of a cargo bed of the vehicle.

BACKGROUND OF THE INVENTION

Motor vehicles such as pickup trucks include a bed for carrying cargo of widely ranging sizes and shapes. For smaller items of cargo, however, it is desirable to restrain such items from movement within the bed so that the articles do not move or slide around within the bed during use of the vehicle. Previous mechanisms for this purpose have met with varying degrees of success. However, what is needed is a storage system that, in addition to providing storage space within a side panel of the cargo bed, may include a bed divider that can be positioned within the truck bed and move easily between a plurality of positions within the bed to fit cargo or articles of varying shapes and sizes. Even more particularly, what is needed is a storage system that increases the storage capacity of the vehicle and increases the functionality of the vehicle by including a divider that can be adjustably positioned at a number of positions within the truck bed, and that can also be quickly and easily moved out of the way to allow very large items to be easily loaded and carried within the truck bed without interference from the bed divider.

SUMMARY OF THE INVENTION

The present teachings provide a cargo bed management system for storing items in a storage receptacle integrated into a side panel of a vehicle bed in conjunction with a dividing system that may be used to divide or extend a bed of a motor vehicle. The cargo bed management system includes a storage system that includes a receptacle integrated into a side panel of a vehicle bed and a dividing system that includes main panel having a length approximately equal to a width of the bed, and a pair of side panels hingedly connected to the main panel so that the side panels may rotate relative to the main panel from a stowed position where the side panels are integral with the main panel to an extended position where the side panels extend outward from the main panel. At least one bumper is affixed to an end of each of the side panels that are hingedly connected to the main panel such that the bumper increases a length of the main panel when said the panels are in the stowed position. The bumpers compress to secure the main panel and the side panels to the bed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present teachings will become more fully understood from the detailed description and the accompanying drawings, wherein.

DETAILED DESCRIPTION OF THE PREFERRED EMBODIMENTS

Figure 1:
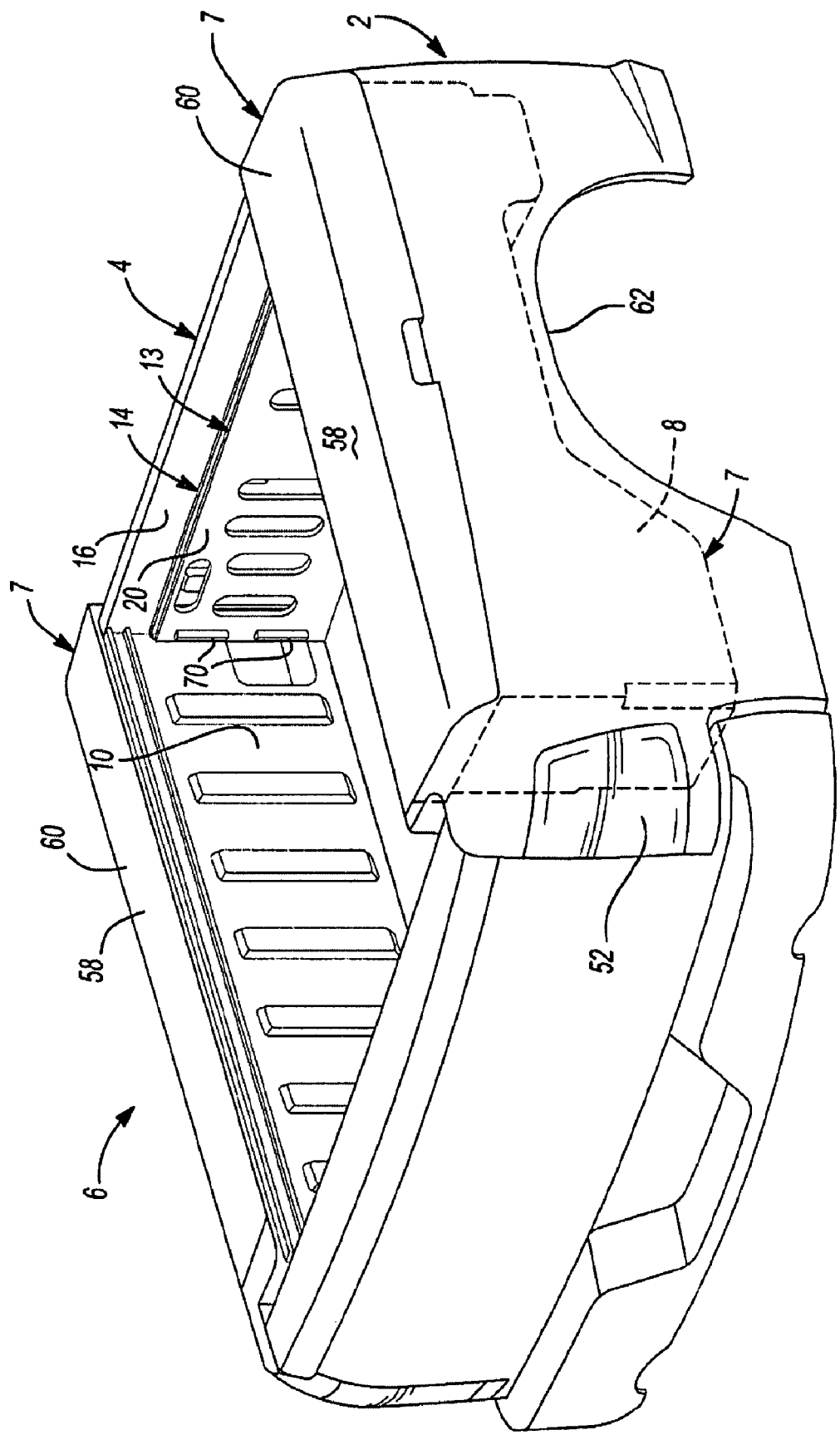
FIG. 1 is a perspective view of a cargo bed management system according to the present teachings in a stowed position.

The following description of the preferred embodiment(s) is merely exemplary in nature and is in no way intended to limit the invention, its application, or uses.

Referring to FIGS. 1-8, a motor vehicle 2 having a cargo bed 4 includes a cargo bed management system 6 according to the present teachings. The cargo bed management system 6 may include a storage system 7 that may include pair of receptacles 8 (FIG. 9) that may be integrated into side walls 10 of the cargo bed 4 of the motor vehicle 2, as well as a removable dividing system 14 that may compartmentalize the cargo bed 4.

Dividing system 14 may include a main panel 16 having a pair of side panels 18 secured thereto. Dividing system 14 may be converted from an integral assembly 13 that may be stowed at the front 20 of the bed 12 of the vehicle 10 (FIG. 1) or used as a bed dividing system (FIG. 2), to an assembly 15 that may be used to extend the bed 4 of the motor vehicle 10 (FIG. 3). To extend the side panels 18 outward from the main panel 16 to an extended position that may be used to extend the bed of the motor vehicle.

Figure 2:
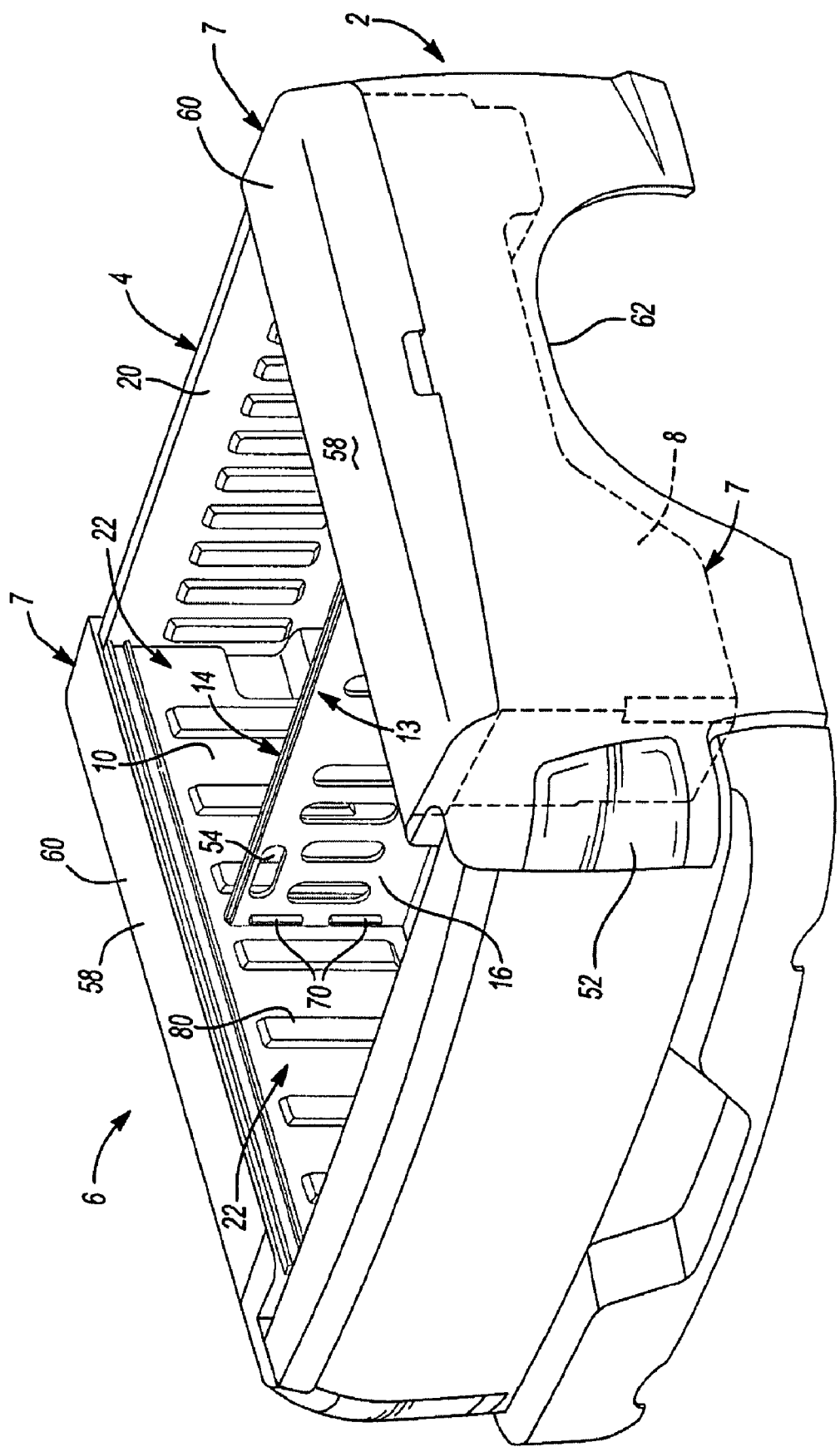
FIG. 2 is a perspective view of a dividing system according to the present teachings in a position that divides a bed of a motor vehicle.
Figure 3:
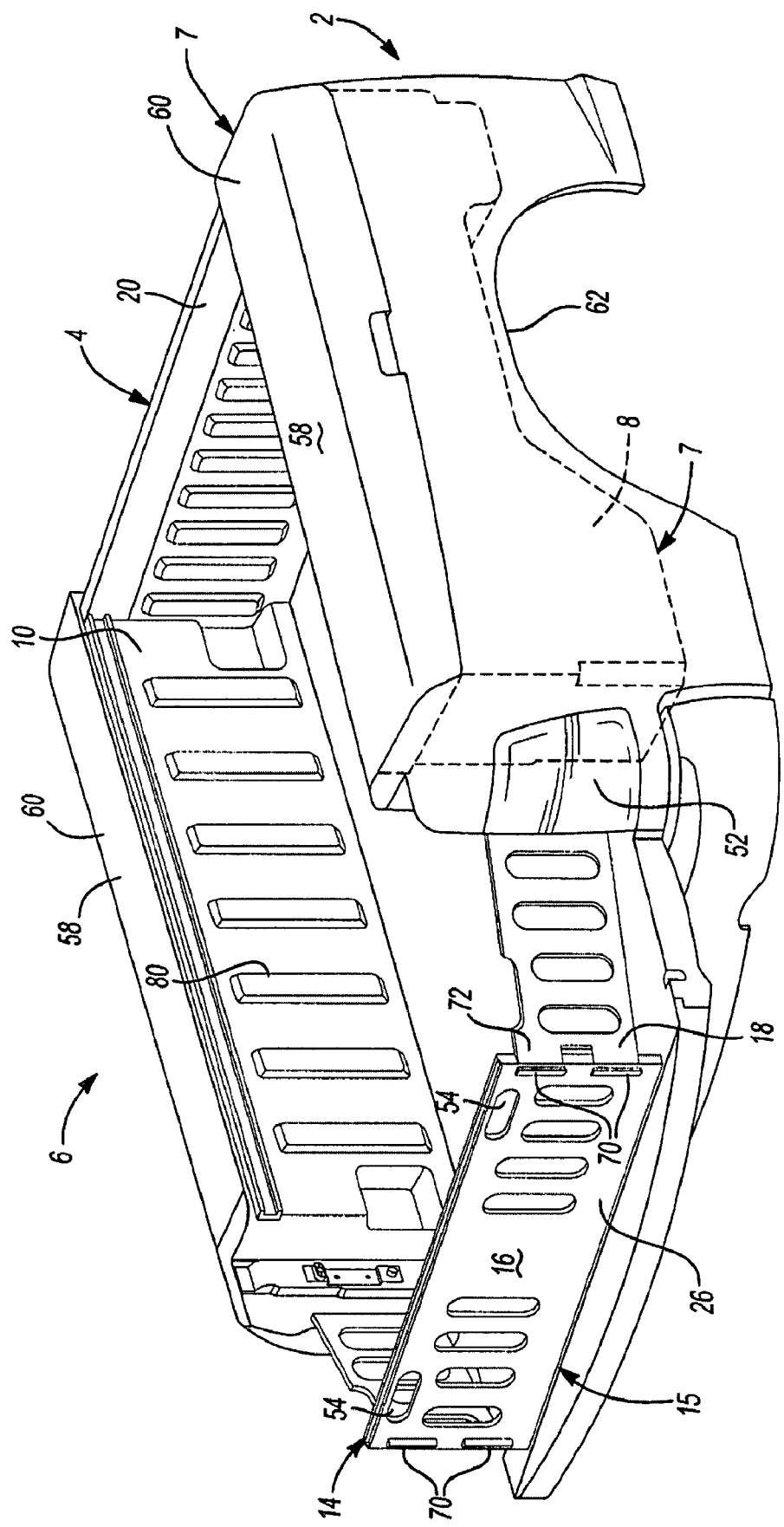
FIG. 3 is a perspective view of a dividing system according to the present teachings in a position that extends a bed of a motor vehicle.

As best shown in FIGS. 1 and 2, dividing system 14 as an integral assembly 13 may be in a stowed position at the front 20 of bed 4 of motor vehicle 10 or a divided position where bed 4 of motor vehicle 10 may be divided into a pair of compartments 22. In the stowed and divided positions, side panels 18 may be rotated at a hinge 24 toward a central portion 26 of main panel 16.

Figure 4:
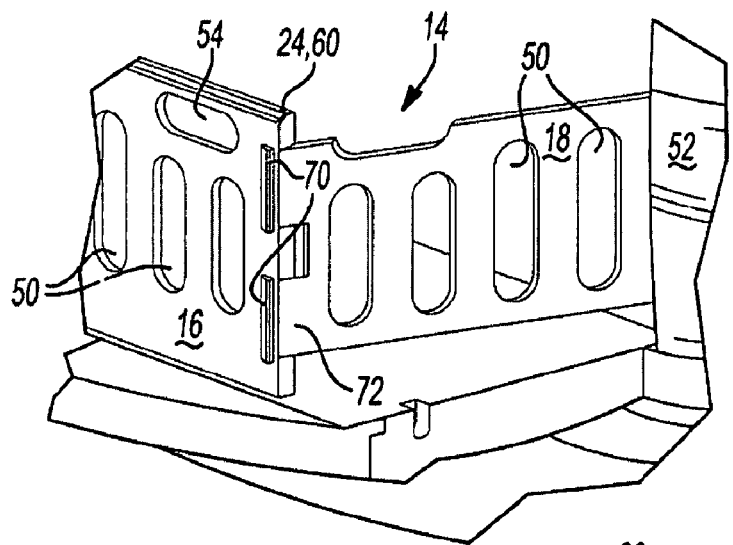
FIG. 4 illustrates a locking mechanism that secures a side panel to a principal panel of the dividing system of the present teachings.
Figure 8:
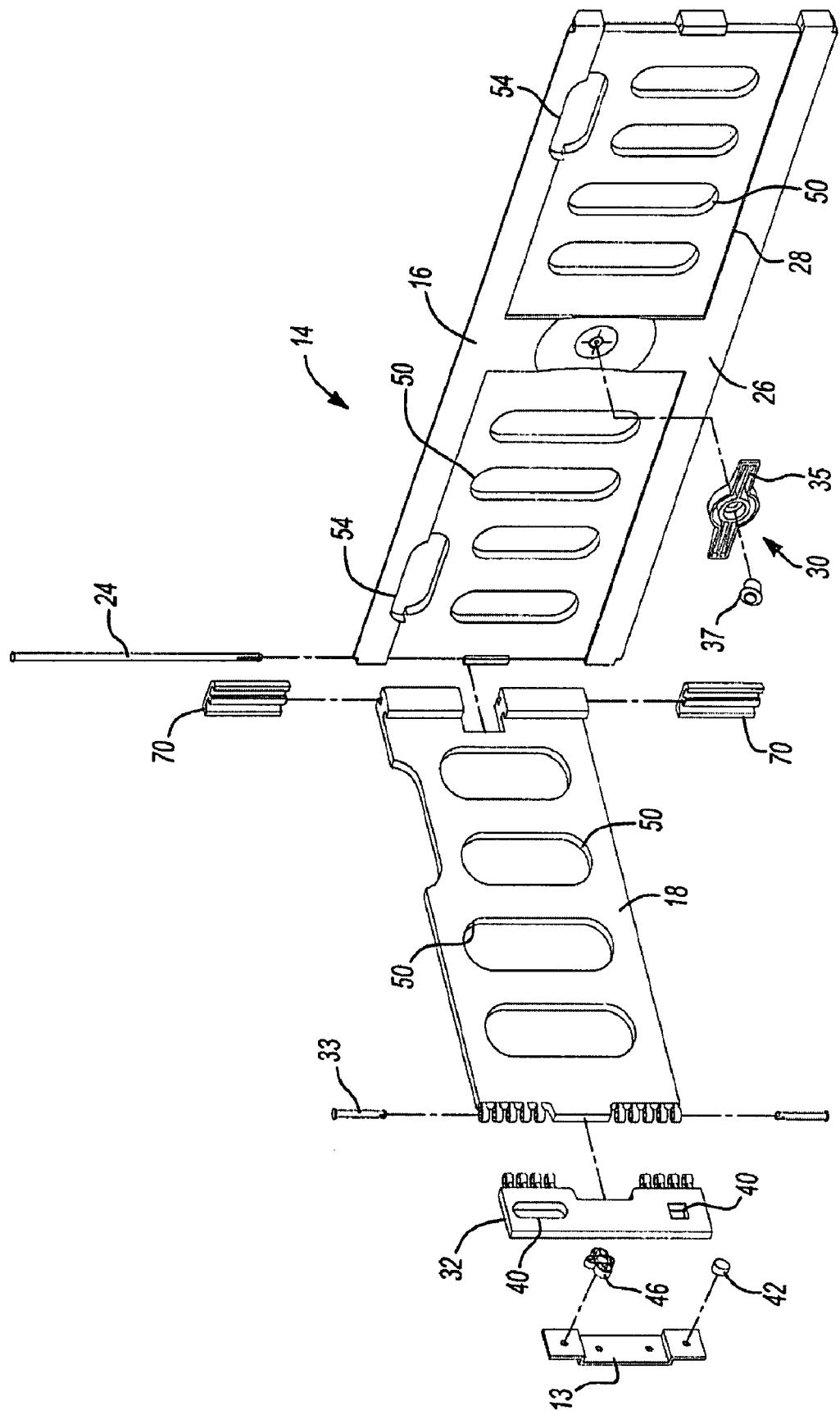
FIG. 8 is an exploded perspective view of a side panel and main panel of the dividing system of the present teachings.

As shown in FIGS. 4 and 8, to accommodate side panels 18 when side panels 18 are rotated toward a central portion 26 of main panel 16, main panel 16 may be provided with a recessed portion 28 having the same shape and dimensions as each of side panels 16. In this regard, side panels 18 may have a width that is less than a width of main panel 16 so that side panels 18 may be accommodated within main panel 16. It is contemplated, however, that side panels 18 have a width that is equal to a width of main panel 16.

Figure 5:
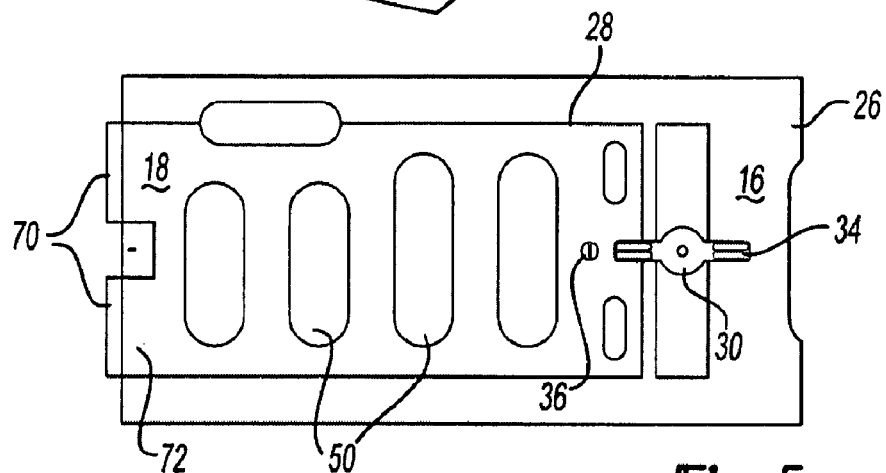
FIG. 5 illustrates a locking mechanism that secures a side panel of the dividing system to a bed of a motor vehicle.
Figure 6:
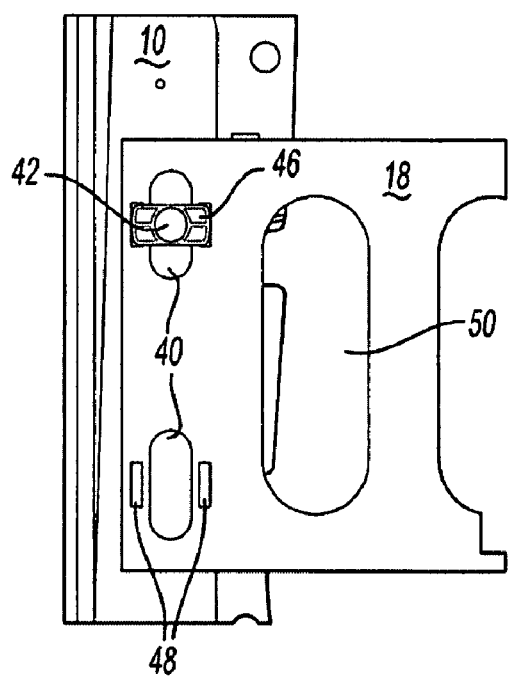
FIG. 6 is a perspective view of a joint between a principal panel and a side panel of the dividing system according to the present teachings.
Figure 7:
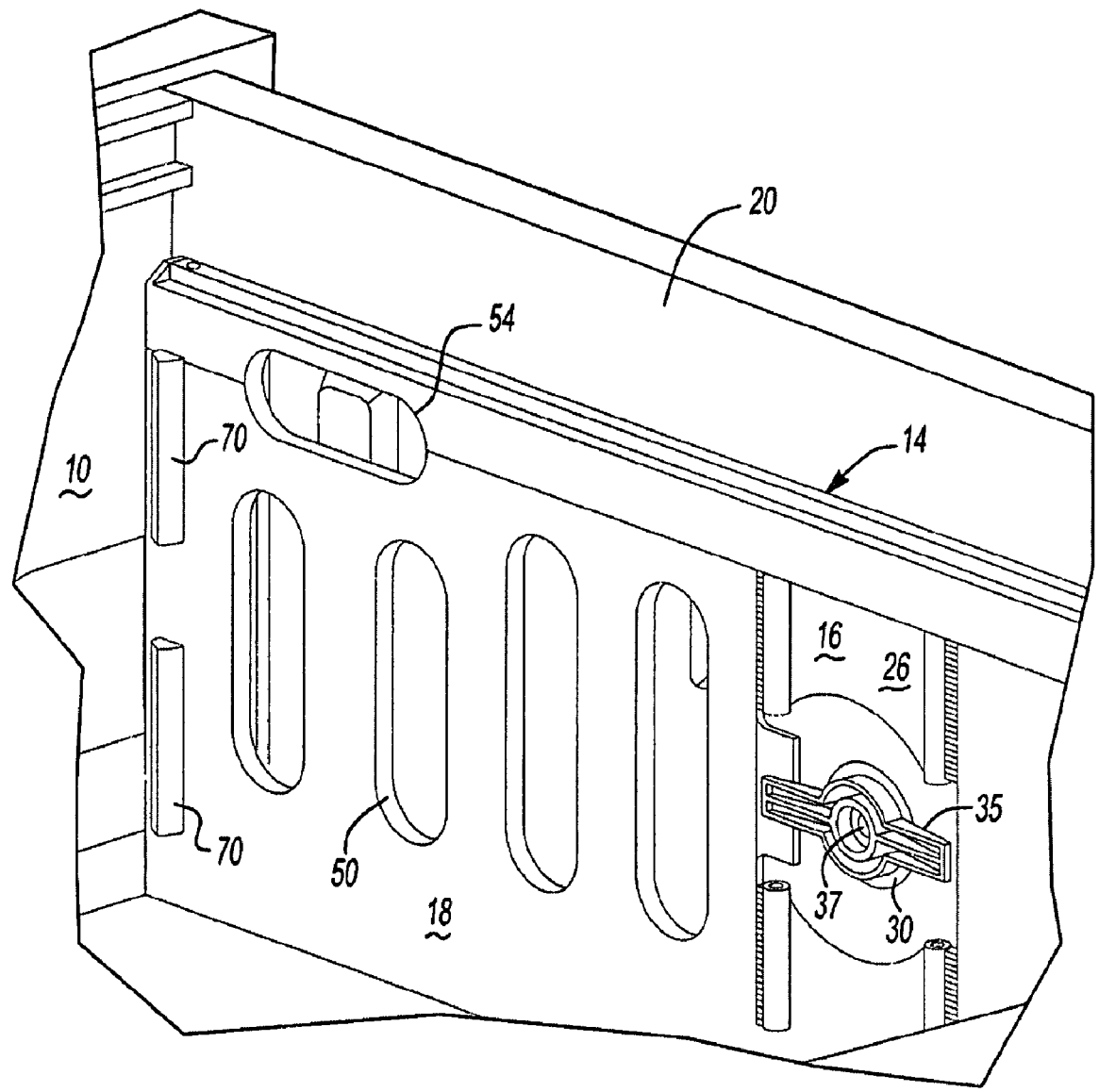
FIG. 7 is an enlarged, perspective view of the dividing system in the stowed position.

To secure side panels 18 to main panel 16 when side panels 18 are rotated toward the central portion 26 of main panel 16 to a closed position, as shown in FIG. 5, main panel 16 may be provided with a pair of locking mechanisms 30 that secure ends 32 of side panels 18 to main panel 16. Locking mechanism 30 may be, for example, a handle 34 that may be simply rotated by a quarter-turn to secure side panels 18 to main panel 16. Alternatively, locking mechanism 30 may be a key cylinder 36 that permits the owner of dividing system 14 to lock side panel 18 to main panel 16. Another alternative is shown in FIGS. 7 and 8, where locking mechanism 30 may be a handle 35 including a key cylinder 37. Regardless, it should be understood that when the dividing system 14 is to be an integral assembly 13, side panels 18 may be securely fastened to main panel 16.

When the dividing system 14 is in the extended position or open position illustrated in FIG. 3, side panels 18 may be rotated outward from main panel 16. Although side panels 18 in their extended position relative to main panel 16 are illustrated in FIG. 3 to be angled relative to main panel 16, it should be understood that side panels 18 may be rotated through a full 180° to be essentially co-planar with main panel 16 without departing from the spirit and scope of the present teachings. To secure the dividing system 14 to bed 4 of motor vehicle 10 when side panels 18 are in an extended position relative to main panel 16, ends 32 of side panels 18 may be provided with a pair of slots 40 that may be mated with a knob or protrusion 42 formed on a sidewall 10 of bed 4 of motor vehicle 2, or on a bracket 13 attached to sidewall 10 (see FIG. 8).

More particularly, referring to FIG. 5, sidewalls 10 of bed 4 of motor vehicle 2 may be provided with at least one protrusion 42 or handle 46 that corresponds to a slot 40 formed in an end 32 of side panels 18. When a handle 46 is used, slot 40 may have a shape that corresponds to a shape of the handle 46 to allow handle 46 to pass therethrough. Once handle 46 has passed through slot 40, handle 46 may be rotated by a ¼ turn to secure side panel 18 to sidewall 10 of bed 4. Side panel 18 may also be provided with a pair of burrows or recesses 48 that correspond to a pair of nubs (not shown) that may be formed on a surface of handle 46 that faces sidewall 10 of bed 4. In this manner, handle 46 is prevented from rotating during operation of motor vehicle 2 and dividing system 14 may be reliably secured to the bed 4.

As best shown in FIGS. 3 and 8, when dividing system 14 is in the extended position 15, side panels 18 are angled relative to main panel 16 to enable dividing system 14 to be secured to sidewall 10 of bed 4. To properly align and secure side panels 18 to sidewall 10, ends 32 of side panels 18 are hingedly connected to side panels 18 by a hinge 33. Hingedly connecting ends 32 to side panel 18 enables slots 40 to properly mate with protrusion 42 and handle 46. In this manner, dividing system 14 may be properly secured to bed 4 of vehicle 2.

Main panel 16 and side panels 18 of dividing system 14 may be formed of any material known to one skilled in the art. In this regard, preferable materials include a blow- or injection-molded plastic that is lightweight and able to withstand various changes in pressure and weight if the cargo in bed 4 were to shift during operation of motor vehicle 2. Other materials include metal such as steel, aluminum, magnesium, alloys thereof, polymeric materials, and thermoplastic materials. Regardless, as stated above, the material should be lightweight and have adequate strength to permit storage of various items within bed 4 without damaging or destroying panels 16 and 18 of dividing system 14.

Main panel 16 and side panels 18 are generally planar panels that may be formed to include a plurality of perforations 50 that enable other motorists to see the motor vehicle's tail lamps 52. In this regard, tail lamps 52 must be visible at up to a 45° angle relative to motor vehicle 2, and 13% of tail lamp 52 must be visible at all times. It should be understood, however, that solid panels 16 and 18 are also contemplated by the present teachings and are not out of the spirit and scope thereof.

To lift dividing system 14 from the stowed position and place system 14 in either the divided position or extended position, panels 16, 18 may be formed to have various handles 54 formed therein. These handles 54 are best shown in FIG. 5. Although handles 54 in FIG. 5 are shown to be formed in panels 16, 18, handles 54 that are attached to panels 16, 18 may also be used.

Side panels 18 may be attached to main panel 16 through a correction assembly 60 such as a simple hinge 24 that permits side panels 18 to rotate outward from main panel. Alternatively, the side panels 18 may be secured to main panel 16 by a connection assembly such as a drop-pin that permits rotational movement of side panels 18, or a spring-loaded hinge that biases side panels 18 to the extended position relative to main panel 16. Any assembly 60, however, that permits rotational movement of side panels 18 relative to main panel 16 may be used.

When dividing system 14 is in a stowed or divided position, side panels 18 may be rotated toward central portion 26 of main panel 16. When side panels 18 are integral with main panel 16, at least one bumper 70 or compression device extends outward from main panel 16. Compression devices 70 permit the integral assembly 13 to be secured to sidewalls 10 of bed 4 of motor vehicle 2 and are best shown in FIGS. 5, 7, and 8.

Compression devices 70 may be affixed to ends 72 of side panels 18 that are connected to main panel 16. As shown in FIG. 5, compression devices 70 extend outward relative to main panel 16 when side panels 18 are integral therewith. Compression devices 70 may extend outward in a length direction of main panel 16 (i.e., to increase the length of panel 16; see FIG. 5), or extend perpendicularly outward relative to main panel 16 (i.e., to increase the width of panel 16; see FIG. 7). The distance at which compression devices 70 extend outward relative to main panel 16 is dependent on a width of bed 4 of motor vehicle 2, or on a distance between ribs 80 that may be formed on sidewall 10 of bed 4.

More particularly, as best shown in FIGS. 1 and 2, bed 4 of motor vehicle 2 may be provided with a plurality of ribs 80 formed in sidewalls 10. Ribs 80 may be spaced at a distance that is sufficient to accommodate a thickness of the integral assembly 13. That is, ribs 80 may be spaced at a distance that is wide enough to accommodate dividing system 14 when side panels 18 are integral with main panel 16. When the integral assembly 13 is disposed between a pair of ribs 80, compression devices 70 compress in a manner that wedges the assembly 13 between ribs 80. In other words, compression devices 70 provide a length and width dimension to the integral assembly 13 that is either greater than a width of bed 4 or a distance between adjacent ribs 80. Accordingly, due to the increased length or width dimension of the integral assembly 13, the assembly 13 may be secured between sidewalls 10 of bed 4, or between each of ribs 80 in a manner that prevents movement of system 14 in the stowed and divided positions.

Although the above configurations are described and illustrated relative to a dividing system 14 that may traverse a width of bed 4, it should be understood that the present teachings are equally applicable to a dividing system 14 that may traverse a length of bed 4. That is, dividing system 14 may be designed to divide or be stowed in bed 4 in a length direction of bed 4. In this regard, lengths of main and side panels 16 and 18 may be adjusted to accommodate a length dimension of bed 4 as opposed to a width dimension of bed 4 of motor vehicle 2.

Compression devices 70 may be formed of any compressible material that provides a compressible and non-skid surface to secure dividing system 14 to bed 4 of motor vehicle 2. Materials include, for example, compressible elastomers, polymers, and rubbers. Other alternative materials include foam-based materials.

Now referring to FIG. 9, storage system 7 of cargo bed system 6 will be discussed. Storage system 7 may be composed of receptacles 8 integrated into sidewalls 10 of bed 4. Receptacles 8 of sidewalls 10 may generally be defined by a container 56 that may be opened and closed by a panel door 58. Panel door 58 may generally be formed by at least a portion of an upper surface 60 of sidewalls 10. In this regard, panel door 58 may include a contour that matches a contour of upper surface 60 of sidewall 10. Accordingly, when panel door 58 is in a closed position, panel door 58 is essentially co-planar with upper surface 60 of sidewall 10.

As receptacles 8 may be disposed within sidewall 10, receptacles 8 may be formed to have a shape that accommodates wheel well 62 of side wall 10. Receptacle 8, therefore, may include a central portion 64 having a length $L_1$ that spans wheel well 60 and a height $H_2$ that defines a first volume. End portions 66 of receptacle 8 may be adjacent to wheel well 60 and have length ($L_2$ and $L_3$) and height dimensions ($H_2$ and $H_3$) that differ from central portion 64 to define second and third volumes, respectively. Because end portions 66 may have dimensions that differ from central portion 64, a total volume of receptacle 8 may be increased or varied to account for the integration of receptacles 8 into sidewalls 10.

Figure 9:
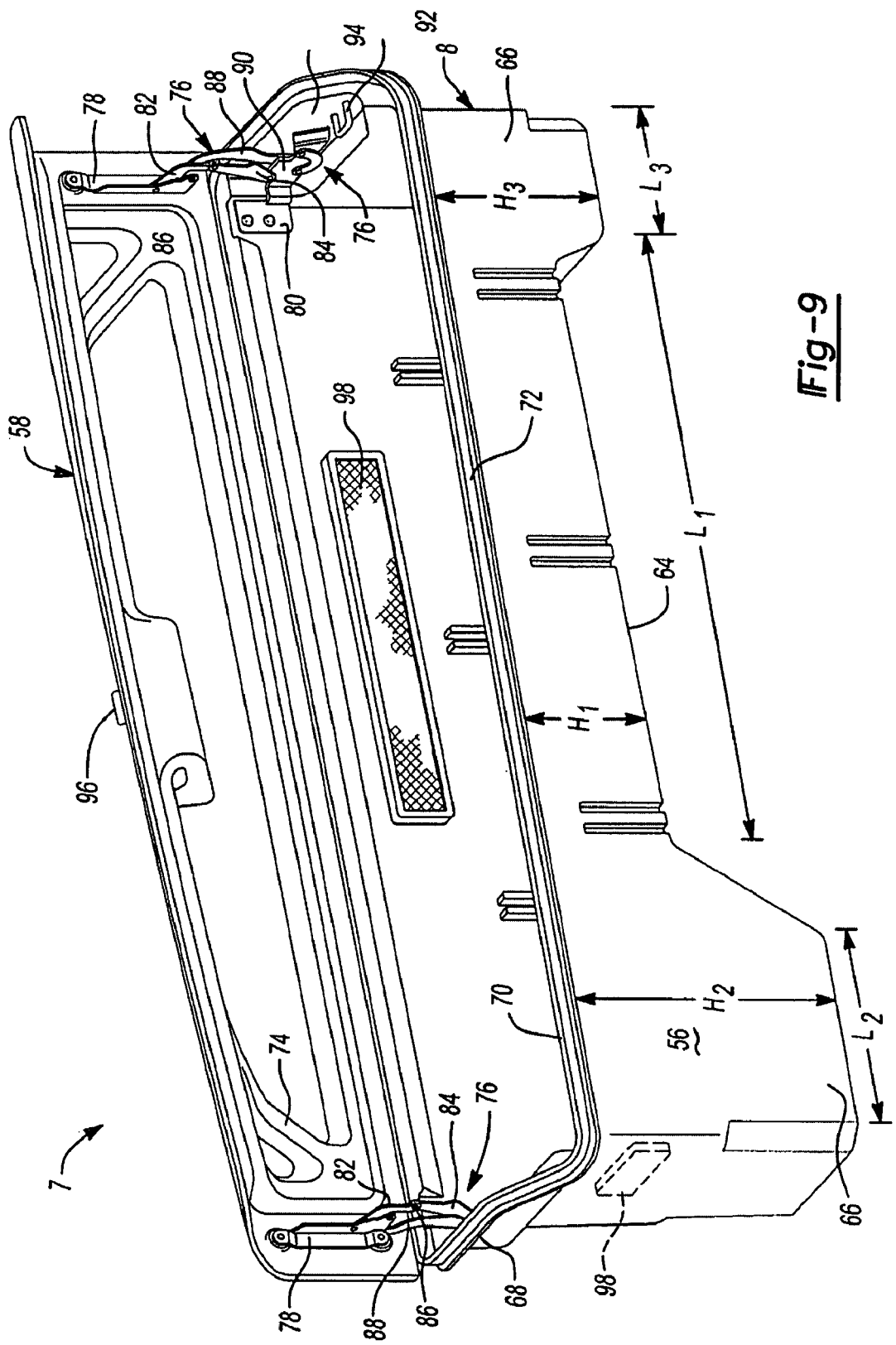
FIG. 9 is a perspective view of a storage system of the cargo management system according to the present teachings.

End portions 66 may each have the same dimensions and volume or, as illustrated in FIG. 9, have different dimensions and, therefore, different volumes. Regardless, it should be understood that receptacle 8 may be formed to have an overall volume that may vary according to any criteria that is desired by one skilled in the art, and that end portions 66 may be formed to have differing dimensions and volumes to accommodate any application desired.

To mount receptacle 8 within sidewall 10, receptacle 8 may be screwed or bolted to sidewall 10. Receptacle 8 may also include a flange 68 that peripherally surrounds upper edges 70 of receptacle 8. Flange 68 may rest on a lip (not shown) formed in sidewall 10 a distance from upper surface 60 of sidewall 10 that enables receptacle 8 to be hidden from view when panel door 58 is closed. Flange 68 may be provided with a seal 72 that prevents water and debris from entering receptacle 8 when panel door 58 is closed. In addition, seal 72 may function as a cushion that prevents damage to receptacle 8 and panel door 58 if panel door 58 is shut with great force. Seal 72 may be formed of, for example, ethylene propylene diene monomer (EPDM), or any material known to one skilled in the art that is suitable for sealing and cushioning.

As stated above, panel door 58 may include a shape and contour that corresponds to contour of sidewall 10. To maintain sufficient structural integrity of sidewall 10, panel door 58 may be formed of the same material as sidewall 10. In this regard, panel door 58 may be formed of steel, aluminum, a composite material, or any other material that is suitable for forming sidewalls 10 of motor vehicle 2. Furthermore, panel door 58 may be provided with structural ribs 74 that enhance the structural integrity of panel door 58.

Receptacles 8 may be formed of any material desired. For example, receptacles 8 may be formed of a metal material or a plastic material. To reduce weight of vehicle 2, however, plastic materials are preferably utilized. Furthermore, the use of plastic materials to form receptacles 8 increases the ability to form different sizes and shapes of receptacles 8. In this regard, receptacles 8 may be blow molded or injection molded in any shape or size desired. Other molding process, such as compression molding, may also be used.

Panel door 58 may be coupled to receptacle 8 by a pair of hinge mechanisms 76. Hinge mechanisms 76 may include a pair of brackets 78 and 80 coupled to panel door 58 and receptacle 8, respectively. Connecting brackets 78 and 80 are a pair of link arms 82 and 84 coupled at a hinge 56. Such a configuration forms a multi-link hinge.

Additionally, hinge mechanisms 76 may include a hook and latch system 86 that may be used to secure panel door 58 to receptacle 8. To actuate hook and latch system 86, an actuation arm 88 may be rotatably fixed to panel door 58 and a latch 90 that may slidably mounted between the bracket 80 secured to receptacle 8 and a hook 92 fixed to an inner wall 94 of receptacle 8 a distance from bracket 80. When panel door 58 is closed, actuation arm 88 forces latch 90 to slide toward hook 92. Once latch 90 reaches hook 92, latch 90 couples to hook 92 and secures panel door 58 to receptacle 8. To further prevent opening of panel door 58 and potential theft of any articles stored in receptacle 8, panel door 58 may be provided with a locking device 96 which enables the owner of the vehicle to lock storage system 7 when system 7 is not being used.

Lastly, receptacle 8 may be provided with illumination devices 98 that may be integrated into a sidewall or lid of the bin. In this regard, illumination devices may include a switch (not shown) that is actuated when panel door 58 is opened to illuminate illumination devices 98. Alternatively, illumination devices 98 may be a device such that when a user of vehicle 2 depresses illumination device it will illuminate. To turn off illumination devices 98, panel door 58 may be closed, or the user may simply depress illumination device 98 again.

The description of the present teachings is merely exemplary in nature and, thus, variations that do not depart from the gist of the present teachings are intended to be within the scope of the present teachings. Such variations are not to be regarded as a departure from the spirit and scope of the present teachings.

What is claimed is:

1. A cargo management system for a bed of a motor vehicle, comprising:
    a storage system including a receptacle integrated into a sidewall of the bed; and
    a dividing system for dividing the bed, the dividing system including:
        a main panel; and
        a pair of side panels rotatably coupled to said main panel between an open position and a closed position, said side panels extending outward from said main panel in said open position and being integral with said main panel in said closed position, each of said side panels including at least one compressible member at an end thereof,
    wherein when said side panels are in said closed position, said compressible members extend outward from edges of said main panel to secure the extension system to the bed of the motor vehicle.

2. The cargo management system of claim 1, wherein said storage system includes a panel door hingedly connected to said sidewall.

3. The cargo management system of claim 2, wherein said storage system includes a hook and latch system that secures said panel door to said receptacle.

4. The cargo management system of claim 3, wherein said hook and latch system is actuated by closing said panel door.

5. The cargo management system of claim 1, wherein said receptacle includes an illumination device.

6. The cargo management system of claim 1, wherein said receptacle includes a main portion that accommodates a wheel well of said sidewall and a pair of end portions adjacent said sidewall.

7. The cargo management system of claim 6, wherein said end portions have different volumes.

8. The cargo management system of claim 1, wherein said compressible members are formed of a compressible material.

9. The removable extension system of claim 2, wherein said compressible material is a rubber- or polymeric-based material.

10. The removable extension system of claim 1, wherein said side panels, in said open position, are connectable to the bed.

11. A cargo management system for a bed of a motor vehicle, comprising:
   a storage system including a receptacle integrated into a sidewall of the bed; and
   a dividing system including a main panel having a length approximately equal to a width of the bed, a pair of side panels hingedly connected to said main panel so that said side panels may rotate relative to said main panel from a stowed position where said side panels are integral with said main panel to an extended position where said side panels extend outward from said main panel, and at least one bumper affixed to an end of each of said side panels that is hingedly connected to said main panel such that said bumper increases a length of said main panel when said side panels are in said stowed position,
   wherein when said main panel and said side panels are integral and disposed across said width of the bed, said bumpers compress to secure said main panel and said side panels to the bed.

12. The cargo management system of claim 11, wherein said storage system includes a panel door hingedly connected to said sidewall.

13. The cargo management system of claim 12, wherein said storage system includes a hook and latch system that secures said panel door to said receptacle.

14. The cargo management system of claim 13, wherein said hook and latch system is actuated by closing said panel door.

15. The cargo management system of claim 11, wherein said receptacle includes an illumination device.

16. The cargo management system of claim 11, wherein said receptacle includes a main portion that accommodates a wheel well of said sidewall and a pair of end portions adjacent said sidewall.

17. The cargo management system of claim 16, wherein said end portions have different volumes.

18. The cargo bed management system of claim 11, wherein said bumpers are formed of a compressible material.

19. The cargo bed management system of claim 11, wherein said bumpers provide a non-skid surface between said panels and the bed.

20. A cargo bed management system that may be disposed to traverse a width of a bed of a motor vehicle or disposed to extend a length of the bed, the bed including sidewalls that include a plurality of ribs, the cargo bed management system comprising:
   a storage system including a receptacle integrated into the sidewall of the bed and a panel door hingedly connected to the sidewall; and
   a dividing system including main panel having a length approximately equal to the width of the bed and a width approximately equal to a distance between the ribs, a pair of side panels rotatably coupled to the main panel such that said side panels may rotate toward a central portion of said main panel to form an integral assembly and rotate outward away from said central portion to form an extended assembly, and a plurality of bumpers attached to either said main panel or said side panels,
   wherein said bumpers compress upon disposition of said integral assembly across the width of the bed between the sidewalls of the bed or between the ribs of the sidewalls to secure said integral assembly to the bed.

* * * * *

UNITED STATES PATENT AND TRADEMARK OFFICE
Certificate

Patent No. 7,828,356 B2

Patented: November 9, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kenneth L. Wood, Clinton Township, MI (US); Ian N. Dupret, Farmington Hills, MI (US); Derek Lane-Waters, Rochester Hills, MI (US); Arif Abbasi, Ann Arbor, MI (US) and Ronald S. Zarowitz, Orchard Lake, MI (US).

Signed and Sealed this Twenty-fourth Day of June 2014.

D. GLENN DAYOAN
*Supervisory Patent Examiner*
Art Unit 3612
Technology Center 3600